Aug. 6, 1935.   B. J. ANDERSON   2,010,450
VELOCIPEDE
Filed Aug. 25, 1934   2 Sheets-Sheet 1
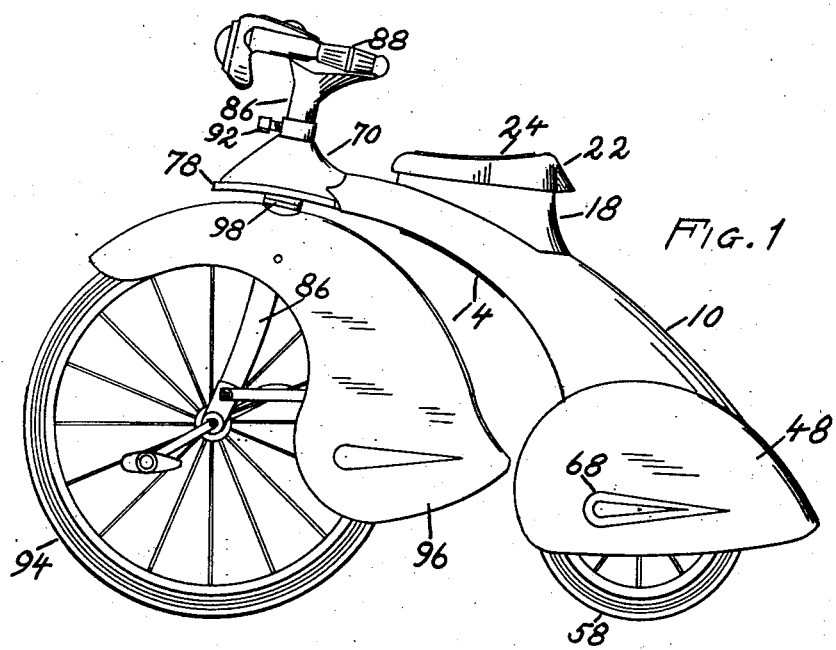
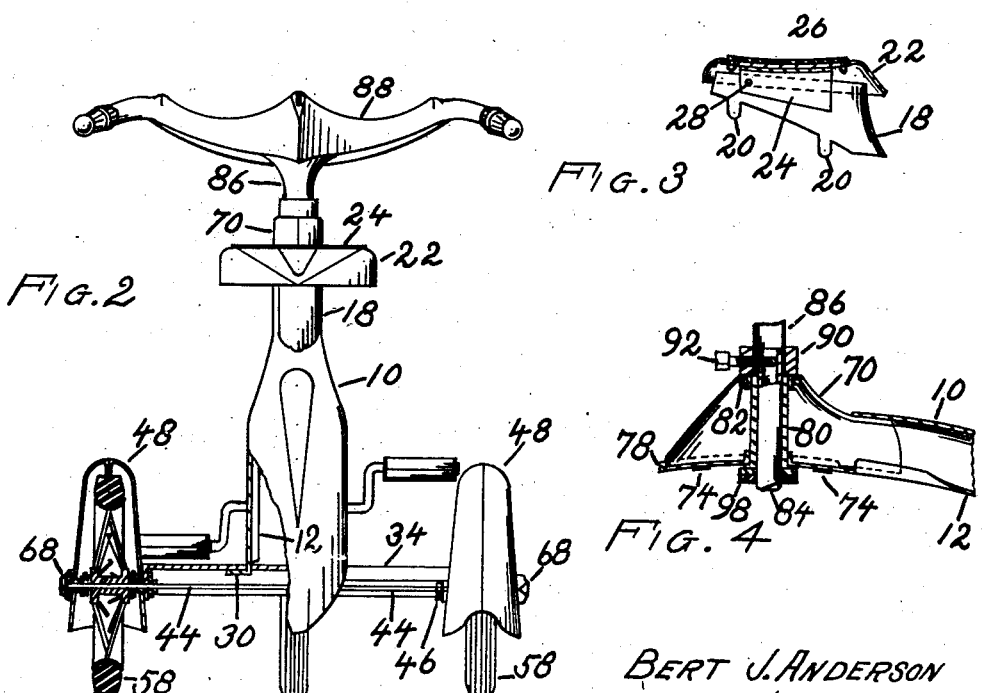
BERT J. ANDERSON
INVENTOR
By Leon T. Hooper
ATTORNEY

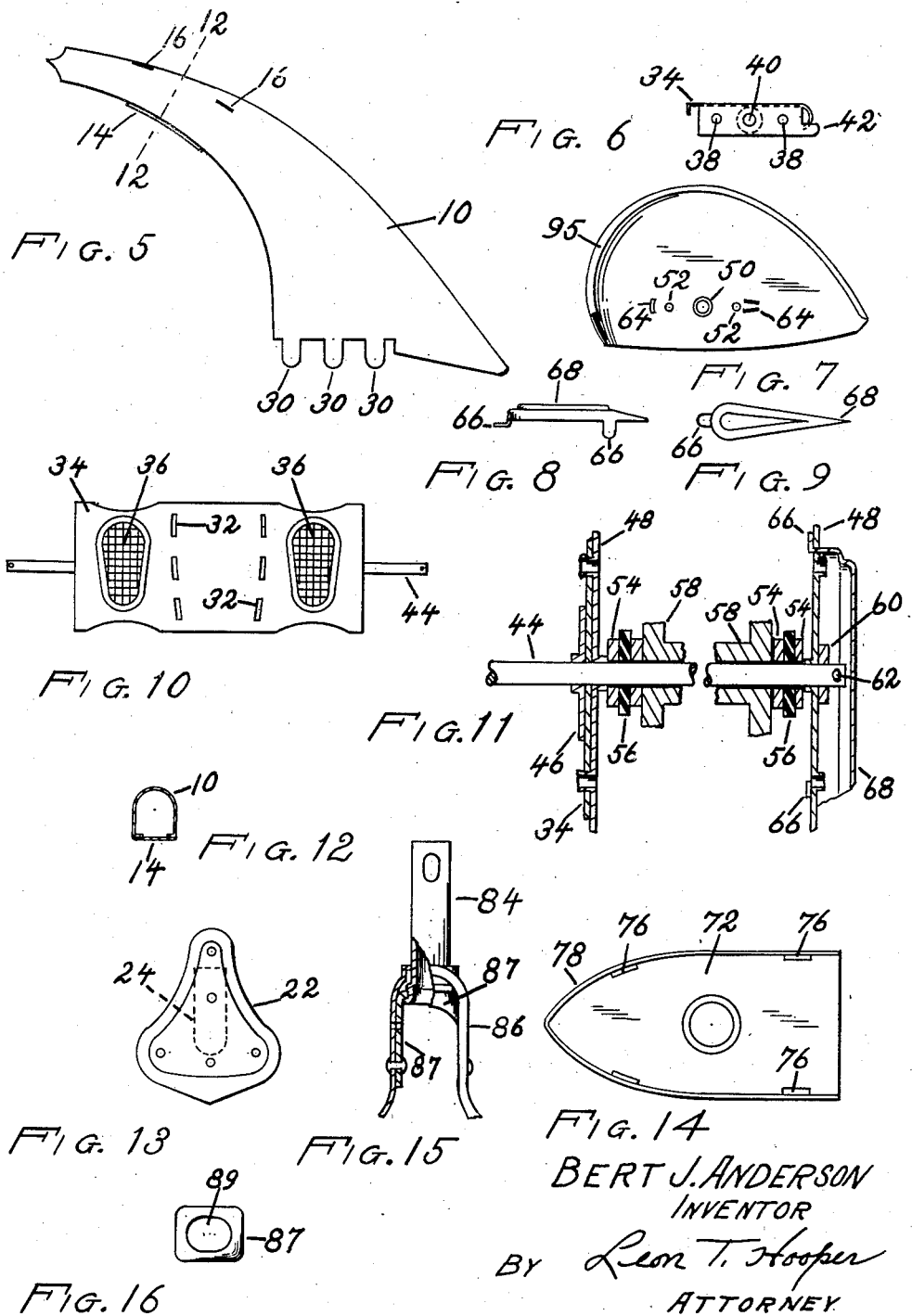

Patented Aug. 6, 1935

2,010,450

UNITED STATES PATENT OFFICE 2,010,450

VELOCIPEDE

Bert J. Anderson, Hammond, Ind.

Application August 25, 1934, Serial No. 741,392

10 Claims. (Cl. 208—113)

This invention relates to an improvement in velocipedes, and has for one of its principal objects the manufacture and assembly of a velocipede having a frame including handle bars, saddle, and fenders of sheet metal. While the preferred embodiment of this invention, as shown in the drawings, is applied to a tricycle, it is apparent that the principles may readily be associated with and become a part of other vehicles, including the various types of bicycles.

Another and further important object of the velocipede of this invention resides in the means for assembling and securing the various parts in their respective positions.

Still another and further important object of this invention is the fact that the grinding operations which follow arc or torch welding are entirely eliminated.

A still further important object of this invention resides in the cushioning means on the axle within the fender to reduce noise.

Another and still further important object resides in the means for supporting the axle on the inner and outer side of each rear wheel.

An additional and further object resides in producing a velocipede which shall be of compact and practical construction, composed of a few simple and strong parts, which may be readily assembled, besides being amenable to low cost of manufacture.

The invention possesses other and further objects of advantage, some of which will be set forth in the following specification and accompanying drawings, which show the preferred embodiment of this invention.

In the drawings:

Figure 1 is a side elevation of one form of this invention.

Figure 2 is a rear view of the velocipede with parts broken away and parts shown in section.

Figure 3 is a sectional view of the saddle and saddle supporting member.

Figure 4 is a slightly enlarged sectional view of the head.

Figure 5 is a detail view of the backbone with head and saddle removed.

Figure 6 is an end view of the axle supporting and deck member.

Figure 7 is an inside view of one section of a fender.

Figure 8 is a side elevation of the fender cap.

Figure 9 is a top plan view of the fender cap.

Figure 10 is a top plan view of the axle supporting and deck member.

Figure 11 is an enlarged sectional view of the axle supporting and wheel retaining means, parts being broken away.

Figure 12 is a sectional view taken on the line 12—12 of Figure 5.

Figure 13 is a top plan view of the saddle with the rubber seat removed.

Figure 14 is a plan view of floor plate member of the head.

Figure 15 is an enlarged front elevation of the fork and steering post with parts broken away.

Figure 16 is a top plan view of the yoke.

As shown in the drawings:

The reference numeral 10 indicates in a general way the backbone of the velocipede of this invention which, in the preferred embodiment, is shaped from a single piece of sheet metal. The backbone 10 is substantially oval in cross section with the edges 12 of the lower side turned inwardly, but spaced apart, to increase the strength of the member and also to improve its appearance.

The upper front portion of the backbone 10 is restricted while the lower rear portion is expanded to form a wide base.

Secured to the bottom surface of the inturned edges of the backbone 10 is a flat plate 14, which curves longitudinally to correspond with the contour of the backbone. This plate 14 prevents the edges 12 of the backbone 10 from spreading or bending.

Located on the upper surface of the restricted portion of the backbone 10, is a plurality of spaced apertures 16.

A saddle support 18 having downwardly extending tongues 20 is adapted to be positioned on the backbone 10, with the tongues 20 extending through the apertures 16 and there secured.

A saddle 22 having a downwardly extending member 24, which is substantially U-shaped in plan, as is best shown by the dotted lines in Figure 13, attached to its lower surface, has a depressed perforated upper surface to which is secured a rubber or other suitable seat 26. The saddle 22 is connected to the saddle support 18, in any suitable manner, but preferably by a pin passing through the hole 28.

Secured to the expanded lower part of the backbone 10 by a plurality of tongues 30, passing through corresponding tongue receiving apertures 32, is a combination axle supporting and deck member 34, having downwardly turned front and rear edges. The member 34, when secured in position by the tongues 30 being turned as shown in Figure 2, may be more rigidly and permanently fixed in position by spot welding the tongues 30 in this position.

The surface of the deck member 34 has a pattern 36 stamped thereon, or other suitable means may be employed as a preventative against slipping.

Each end of the deck member 34 has two small holes 38, and a large center hole 40, pierced therein and is turned downwardly as is best shown in Figures 2 and 6. A tongue 42, on the forward edge of the down turned ends of the deck member 34 is pressed against the forward down turned edge of said deck plate and is there secured.

Positioned in the large center holes 40, and projecting outwardly therebeyond is an axle 44. An apertured washer 46 surrounding the axle 44, and secured to the inner surface of the downturned end of the deck member 34, has the edges of the aperture turned inwardly as is best shown in Figure 11 to form a relatively wide supporting surface for said axle. The turned in edge of the aperture washer 46 may be crimped against said axle to prevent its rotation.

Fenders 48, having axle receiving apertures 50 therein, are secured to the downturned ends of the deck plate 34. The said apertures 50, being in alignment to receive and support the axle 44, as is best shown in Figures 2 and 11.

Passing through each side of the fender 48, are a plurality of pierced holes 52, having outwardly protruding edges corresponding in size and location to the holes 38, in the ends of the deck plate 34. In assembly the edges of the holes 52 are passed through the holes 38, as is clearly shown in Figure 11, in which position they are expanded and thus secure the fender 48, in position. Additional securing means may be used if found desirable.

Rotatably and slidably positioned on the axle 44, adjacent to each inner side of the fender 48, is a pair of metal or hard fiber washers 54, separated by a rubber or soft washer 56. The washers 56, being compressible, allow limited end play of the wheel 58 and also serve to reduce noise caused by the rotation of said wheel.

A metal washer 60, and cotter key 62, in association with the axle 44, as is best shown in Figure 11, secures the axle in operating position.

A plurality of tongue receiving slots 64, preferably located as shown in Figure 7, are made in each side of the fender 48, and thus make each fender operable on either the right or left end of the axle. It will also be apparent that this construction supports the axle on each side of the wheel.

Removably secured to the fender 48, by tongues 66, passing through the slots 64, is a fender cap 68. This cap serves to cover the protruding end of the axle 44, and also enhances the appearance of the completed unit.

Positioned on the restricted upper end of the backbone 10, is a head member 70. The head member 70 consists of an apertured sheet metal upper portion secured to an apertured lower member 72, by means of tongues 74, on the upper portion passing through correspondingly located slots 76, in said lower member. The outer edge 78 of the lower member 72, is turned upwardly to more firmly secure the parts in their related positions. If desirable, the upturned edge 78 may be welded to the upper portion of the head member 70.

The edges of the aperture in the upper portion of the head 70 are turned downwardly and the edges of the aligned aperture in the lower member 72 are turned upwardly to form a wide supporting surface for the bushing 80, which is positioned and secured therebetween, as is best shown in Figure 4. Surrounding the downwardly turned edge of the aperture in the upper portion is a ring 82, which prevents spreading or enlargement of the aperture through hard usage.

A tubular steering post 84 extending from the fork 86' through the bushing 80 and into the tubular standard 86 of the handle bar 88, is there rigidly secured by a ring 90, positioned on the standard 86, and a co-acting setscrew 92, which passes through the aperture 93 and contacts the inner surface of the post 84, as is best shown in Figure 4. This aperture 93 is slightly elongated to allow a limited vertical movement of the set screw 92 therein.

Use of the conventional setscrew and ring in this construction would, when the setscrew was tightened down, scar or crush both the tubular standard and post. It will be noted that this construction allows the setscrew to pass through both the post and the standard and engage the post on its inner surface.

Secured to the fork 86' is a yoke 87, having an oval opening 89 through its top surface, and downwardly extending members on each side thereof. The side members are pierced for attachment to the fork 86'.

In assembling the yoke and post members, the lower end of the tubular post 84 is inserted into and through the oval opening 87, and is then expanded to fill said opening, as is clearly shown in Figure 15. The tubular post is then passed through the aperture in the top of the fork and the members on the side of the yoke 87, are secured to the fork 86', preferably by rivets, although any other suitable means may be used. This construction produces a sturdy and rugged joint without welding.

Secured to the fork 86' and covering the top and rear portion of the wheel 94, is a fender 96 which protects the operator and his clothing from dirt or injury. A rubber or soft fiber washer 98 is positioned on the post 84 between the fender 96 and the lower member 72.

The fenders are preferably made up of two sections, the top edge 95 being turned downwardly, as is clearly shown in Figure 7, for the purpose of welding or otherwise securing the two halves together.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A backbone for a velocipede comprising a stamping having downwardly and inwardly turned sides, the upper front portion of said stamping being restricted to receive a head, the rear lower portion of said stamping formed to be associated with a flat surface, and a plurality of securing tongues projecting from the bottom edge of the stamping.

2. A backbone for a velocipede comprising a sheet metal member substantially U-shaped in cross section, certain portions of the edges being turned inwardly, the lower edges of the front portion being turned inwardly and upwardly to form receiving channels for a head, a plurality of slots in the upper surface of said backbone, and a plurality of securing tongues projecting from the bottom edge of the backbone.

3. A backbone for a velocipede comprising a sheet metal member substantially U-shaped in cross section, a restricted forward portion and an expanded rear portion, the longitudinal curvature of the upper surface of the backbone being regular and the curvature of the lower side turning sharply downward at its center to form a substantially vertical edge, and means on the lower edge of said backbone for securing an axle supporting member thereto.

4. In a velocipede including a sheet metal backbone, a sheet metal axle support positioned at the lower end of said backbone and transverse thereto, tongue and slot means for securing said axle support to said backbone, an axle beneath said axle support and secured thereto, wheels on the axle at each end of said axle support, and means for supporting said axle outside of said wheels.

5. A velocipede including a sheet metal backbone having downwardly extending tongues on its lower edge, a sheet metal axle support having a plurality of slots positioned to receive said tongues, an axle secured to said axle support, a wheel positioned on said axle adjacent each end thereof, a perforated fender secured to each end of the axle support and extending over each wheel and to a point below said axle, the ends of said axle secured in and supported by the aligned perforations in said fenders.

6. A velocipede including a backbone, an axle associated therewith, a wheel on the axle adjacent each end thereof, a fender covering each wheel and secured to and supporting the axle on each side of said wheel, resilient members on the axle on each side of said wheel, and a metal washer on the axle on each side of said resilient members.

7. In a backbone for a velocipede comprising a stamping having a convex upper surface and a concave lower surface, the edges of said concave lower surface being turned inwardly and spaced apart, a portion of said turned in edges adjacent the front end of said backbone being turned upwardly to form a head receiving groove on each side of said backbone, a curved member positioned intermediate the ends of said backbone and associated with and maintaining said lower edges thereof in spaced apart relation, and a plurality of tongue receiving slots on the upper surface of said backbone.

8. In a backbone for a velocipede comprising a stamping having a convex upper surface and a concave lower surface, certain edges of said concave lower surface being turned inwardly and spaced apart and certain edges thereof being turned inwardly and upwardly to form head receiving channels, a curved member associated with and maintaining said edges in their spaced apart relation, and a plurality of tongues depending from the lower edge of said backbone.

9. In a backbone for a velocipede comprising a stamping having a convex upper surface and a concave lower surface, the front end of said stamping being adapted to receive a head, and portions of the edge adjacent said front end being turned inwardly and upwardly to contact the inner surface of said head, the remainder of the edges of said concave lower surface being turned inwardly and spaced apart, a curved member secured to and maintaining said edges in their spaced apart relation and a portion of the lower rear part of said stamping having a plurality of downwardly extending tongues by which a deck plate member may be attached to said backbone.

10. In a backbone for a velocipede, a stamped member having a restricted forward portion and an expanded rear portion, certain parts of the lower edge of said rear portion being adapted to contact the upper surface of an axle supporting member and other parts of said lower edge adapted to extend through and be secured to the under surface of said axle supporting member.

BERT J. ANDERSON.